(12) United States Patent
Ishikawa et al.

(10) Patent No.: US 7,139,106 B2
(45) Date of Patent: Nov. 21, 2006

(54) IMAGE SCANNER INCORPORATING ROTARY ENCODER

(75) Inventors: Yoshiro Ishikawa, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 714 days.

(21) Appl. No.: 09/939,736

(22) Filed: Aug. 28, 2001

(65) Prior Publication Data

US 2002/0114020 A1 Aug. 22, 2002

(30) Foreign Application Priority Data

Feb. 22, 2001 (JP) .............................. 2001-046231

(51) Int. Cl.
*H04N 1/024* (2006.01)
*H04N 1/04* (2006.01)
*G06K 7/00* (2006.01)

(52) U.S. Cl. ...................... 358/473; 358/478; 358/474; 382/312

(58) Field of Classification Search ................ 358/478, 358/473, 471, 474, 475, 496, 498; 382/313, 382/312

See application file for complete search history.

(56) References Cited

U.S. PATENT DOCUMENTS

| | | | | |
|---|---|---|---|---|
| 4,703,186 A | * | 10/1987 | Nakayama et al. | 250/566 |
| 5,953,497 A | * | 9/1999 | Kokubo et al. | 358/1.9 |
| 6,118,553 A | * | 9/2000 | Berg | 358/473 |
| 6,320,679 B1 | * | 11/2001 | Noda et al. | 358/473 |

* cited by examiner

*Primary Examiner*—Jerome Grant
*Assistant Examiner*—Houshang Safaipour
(74) *Attorney, Agent, or Firm*—Westerman, Hattori, Daniels & Adrian, LLP.

(57) ABSTRACT

A hand-held image scanner includes an elongate body, a line sensor extending in the body longitudinally thereof for reading an original document as the body moves along the document, a roller shaft rotatably supported in the body to extend longitudinally of the body, at least one roller supported on the roller shaft for rotating therewith while rolling on the document. The scanner also includes a rotary encoder for detecting the rotation of said at least one roller for determining a scanning distance of the body, and a drive transmission for connecting the roller to the rotary encoder. The rotary encoder includes a rotary disk supported on a disc shaft. The disc shaft extends perpendicularly to the roller shaft.

7 Claims, 7 Drawing Sheets

IMAGE SCANNER INCORPORATING ROTARY ENCODER

BACKGROUND OF THE INVENTION

1. Field of the Invention

The present invention relates to an image scanner. More particularly, the present invention relates to a hand-held image scanner which incorporates a rotary encoder.

2. Description of the Related Art

An image scanner is widely used for reading an image of a document. For convenience of handling, an image scanner is proposed which is held with one hand of the user for image reading.

FIG. 6 illustrates a prior art hand-held image scanner 1. For operation, the scanner 1 may be connected to a personal computer for example. In use, as the user moves the scanner 1 over an original document P in the direction indicated by an arrow A, a line sensor incorporated in the scanner 1 reads an image (or images) carried on the document P. As shown in the figure, the scanner 1 has an elongate box-shaped body 2 which may be made of resin for example. The body 2 has one end provided with a cable 3 for connection to a non-illustrated personal computer. Further, the body 2 has an upper surface 2a provided with a switch 4 adjacent to the other end of the body 2.

FIG. 7 is a bottom view, partially cut away, of the scanner 1, whereas FIG. 8 is a transverse section of the scanner 1. As shown in these figures, the body 2 accommodates a substrate 12 on which a line sensor 26 is mounted. The line sensor 26 comprises a plurality of light receiving elements (photoelectric elements) arranged in a row extending longitudinally of the body 2. The row of light receiving elements has a length corresponding to the image reading width (which is at least equal to but normally greater than the width of the original document P). The body 2 further accommodates a light source 25 (e.g. an LED array) for illuminating the document P. A transparent glass plate 14 is provided at the bottom surface 2b of the body 2. Between the transparent plate 14 and the line sensor 26 is provided a lens array 13 for collecting light reflected from the document P to form an actual-size erect image at the line sensor 26. The body 2 further includes another substrate (not shown) on which an IC chip (not shown) is mounted as a controller for processing the image data from the line sensor 26.

Further, the body 2 is provided with a shaft 6 extending longitudinally of the body 2 and supported therein for rotation. A plurality of rollers 7 are attached on the shaft 6 for rotation therewith. Each of the rollers 7 partially projects outward from the body 2 through an opening 8 formed at the bottom surface 2b of the body 2. As a result, when the scanner 1 is placed on the document P, the rollers 7 come into contact with the document P.

As shown in FIG. 7, the shaft 6 is connected to a rotary encoder 11 via a first and a second gears 9 and 10. Specifically, the first gear 9 is attached to one end 6a of the shaft 6, whereas the second gear 10 is connected to the rotary encoder 11 while engaging the first gear 9. With this structure, the rotary encoder 11 detects the rotational angle or the number of revolutions of the rollers 7.

As shown in FIG. 9, the rotary encoder 28 includes a rotary disc 16 of a predetermined diameter mounted on the same shaft as the second gear 10 is mounted (see FIG. 7). The rotary encode 28 also includes a light emitting element 17 and a light receiving element 18, both housed in a non-illustrated case in facing relationship to each other with the rotary disc 16 interposed therebetween. The rotary disc 16 is formed with a plurality of radially extending slits 19 having a predetermined width. With this structure, as the rotary disc 16 rotates, light emitted from the light emitting element 17 passes through each slit or is blocked by the portion between adjacent slits. The light receiving element 18 detects the light passing through the slits and transmits the detection signals to the controller. Based on the detection signals, the controller determines the rotational angle or the number of revolutions of the rollers 7.

Thus, the above-described scanner 1 is capable of scanning the document image line by line by detecting the number of revolutions of the rollers 7 indicative of the scanning distance of the body 2.

Specifically, while the rollers 7 rotate in contact with the document P in scanning the document image, the rotary encoder 11 detects the rotational angle or the number of revolutions of the rollers 17. Based on the detection signals outputted from the rotary encoder 11, the controller figures out the scanning distance of the body 2 and outputs a timing signal to the line sensor 26 every time the body 2 advances a distance corresponding to one line. The line sensor 26 reads the document image for each line and outputs the image data to the controller upon receiving the timing signal from the controller.

For example, when the resolution is 300 dpi, one line which corresponds to one dot has a width of 0.085 mm (calculated according to the equation "Width=25.4 mm÷300"). Therefore, the controller outputs a timing signal to the line sensor 26 every time the body 2 advances 0.085 mm. The line sensor 26 successively outputs image signals for each line to the controller every time it receives a timing signal.

The controller successively transmits the image signals for each line received from the line sensor 26 to the non-illustrated personal computer for example. The image data is stored in the memory of the personal computer for reproducing a two-dimensional image.

With the above-described structure, it is necessary to enhance the detecting resolution of the rotary encoder 11 for increasing the resolution of the scanner 1. For this purpose, the number of slits maybe increased by narrowing the intervals between the slits 19 or by using a diametrically larger rotary disc.

However, when the interval between the slits is narrowed, the light receiving element may erroneously detect light passing through a wrong slit adjacent to the proper slit. To avoid such erroneous light detection, it is necessary to use a high-precision light emitting/receiving elements, which are however generally expensive.

On the other hand, the use of a diametrically larger rotary disc results in a corresponding increase in the size of the scanner 1, as shown in FIGS. 10 and 11. In these figures, the housing of the scanner is partially omitted for showing the structure within the body 2. As is clear from these figures, the rotary disc 16 is mounted on a support member 24 provided at one end 2c of the body 2 for rotation about a shaft 16a. The scanner 1 also includes a photointerrupter 20 which has a pair of light emitting and light receiving elements (not shown) facing each other with the rotary disc 16 interposed therebetween. Further, the shaft 16a of the rotary disc 16 carries a first pulley 21, whereas a second pulley 22 is attached on a non-illustrated shaft of the rollers. The first and second pulleys 21, 22 are connected to each other via a belt 23 wound therearound, thereby connecting the shaft of the rollers to the rotary disc 16.

As appreciated in FIGS. 10 and 11, the rotary disc 16 projects largely in the thickness direction of the substrate 12.

As a result, the size of the scanner 1 increases correspondingly, which is inconvenient for use.

SUMMARY OF THE INVENTION

It is therefore an object of the present invention to provide an image scanner which is capable of realizing a high resolution without the need for increasing the size of the scanner.

In accordance with the present invention, there is provided an image scanner which comprises an elongate body, a line sensor extending in the body longitudinally thereof for reading an original document as the body moves along the document, a roller shaft rotatably supported in the body to extend longitudinally of the body, at least one roller supported on the roller shaft for rotating therewith while rolling on the document, a rotary encoder for detecting the rotation of said at least one roller for determining a scanning distance of the body, and a drive transmission for connecting said at least one roller to the rotary encoder. The rotary encoder includes a rotary disk supported on a disc shaft. The disc shaft extends in a direction crossing the roller shaft.

Preferably, the disc shaft extends perpendicularly to the roller shaft. Further, the body preferably has an image reading surface for facing the document while the line sensor reads the document, so that the rotary disc is oriented parallel to the image reading surface.

As a result, the rotary disc can be housed in the body without increasing the size of the scanner. Further, it is also possible to increase the diameter of the rotary disc as much as the width of the body permits without increasing the size of the scanner. Accordingly, the number of slits (or any other indicia) formed in the rotary disc can be correspondingly increased for enhancing the detecting resolution of the rotary encoder, which leads to an enhanced resolution in reading the document image.

The image scanner may further comprise a substrate accommodated in the body parallel to the image reading surface, whereas the rotary encoder may also include an optical detector mounted directly on the substrate adjacent to the rotary disc. In this way, the optical detector can be mounted on the substrate together with a controller in a space-efficient manner.

In a preferred embodiment, the drive transmission comprises a first pulley mounted on the roller shaft, a second pulley mounted on the disc shaft, a belt wound around the first pulley and the second pulley, and a pair of intermediate pulleys for bending the belt.

Preferably, the circumferential engaging surface of the first pulley differs diametrically from that of the second pulley.

In another preferred embodiment, the drive transmission further comprises at least one additional pair of intermediate pulleys. In such an embodiment, the additional pair of intermediate pulleys have a respective rotational axis extending parallel to the disc shaft. Further, the roller shaft, the first pulley and the intermediate pulleys are located offset toward a longitudinal side of the body for circumventing an obstructive part.

Other features and advantages of the present invention will become clearer from the detailed description given below with reference to the accompanying drawings.

DETAILED DESCRIPTION OF THE PREFERRED EMBODIMENTS

Preferred embodiments of the present invention will be described below in detail with reference to the accompanying drawings.

Figure 6:
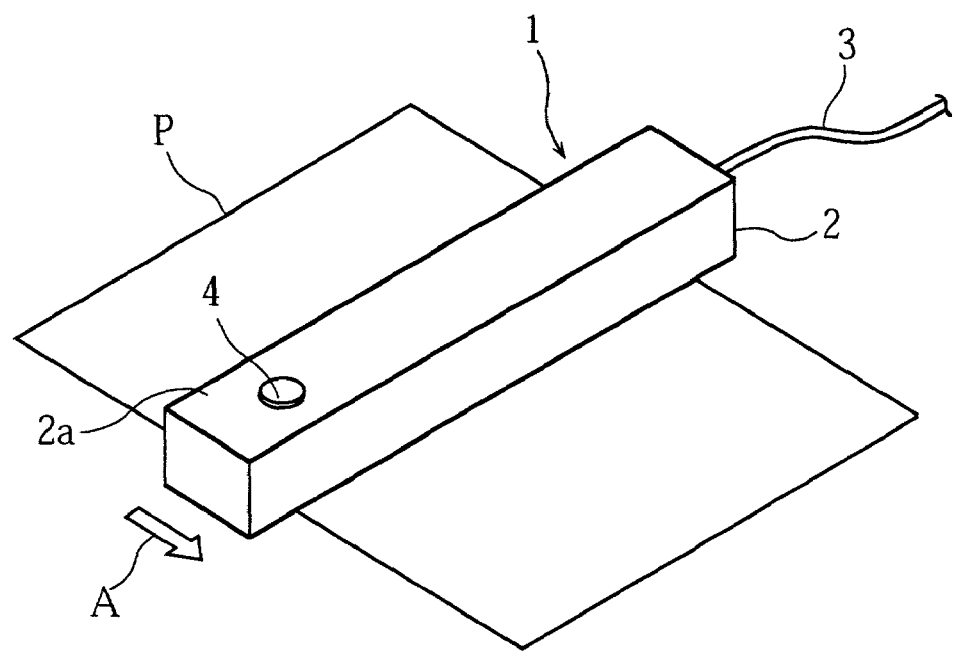
FIG. 6 is a perspective view showing a prior-art image scanner.
Figure 7:
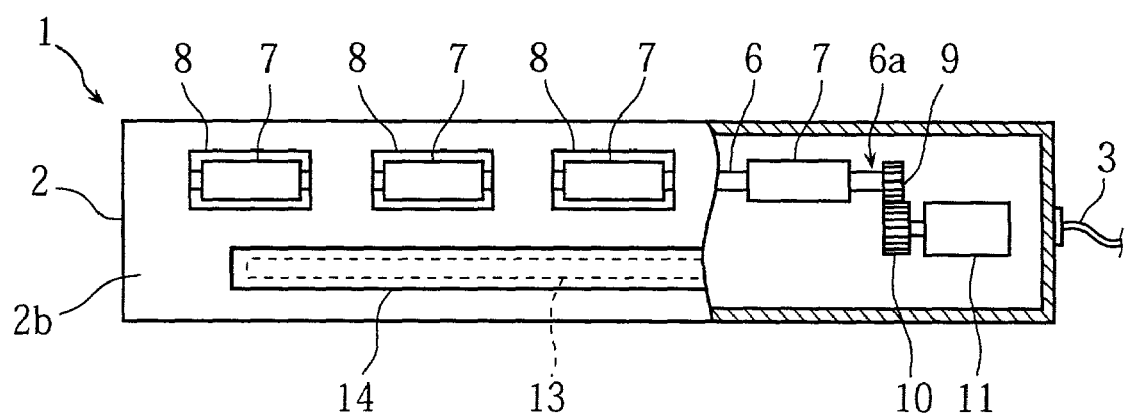
FIGS. 7 is a bottom view of the image scanner of FIG. 6, which is partially cut away.
Figure 8:
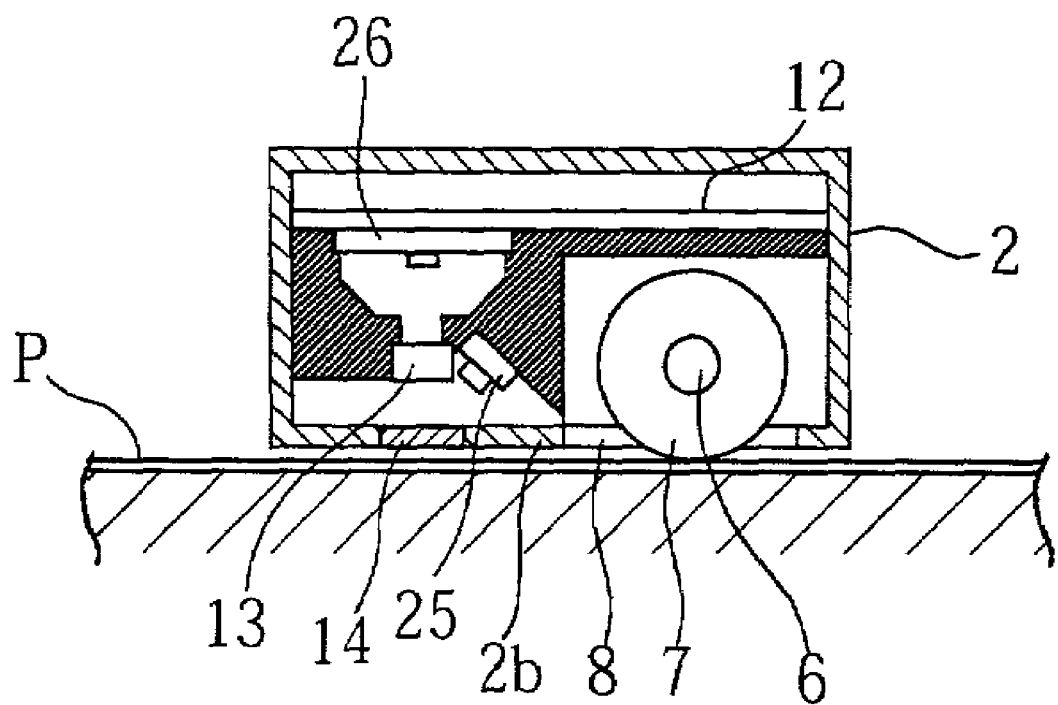
FIG. 8 is a sectional view of the image scanner of FIG. 6.

First, reference is made again to FIG. 6 because a hand-held image scanner according to the present invention may have the same outer appearance and may be used in the same way as the prior art image scanner. Like the prior art image scanner shown in FIG. 6, the hand-held image scanner 1 includes a body 2 having an elongate box-shaped configuration for easy handling by the user. In use, the scanner 1 scans an image of a document P in the direction indicated by an arrow A for reading the image.

One end of the body 2A is provided with a connection cable 3 for connection to a non-illustrated personal computer. The body 2 has an upper surface 2a on which a switch 4 is provided adjacent to the other end of the body 2. The image reading operation of the scanner 1 can be started once the switch 4 is pressed down, whereas the image reading operation may be terminated when the switch 4 is pressed again.

Figure 1:
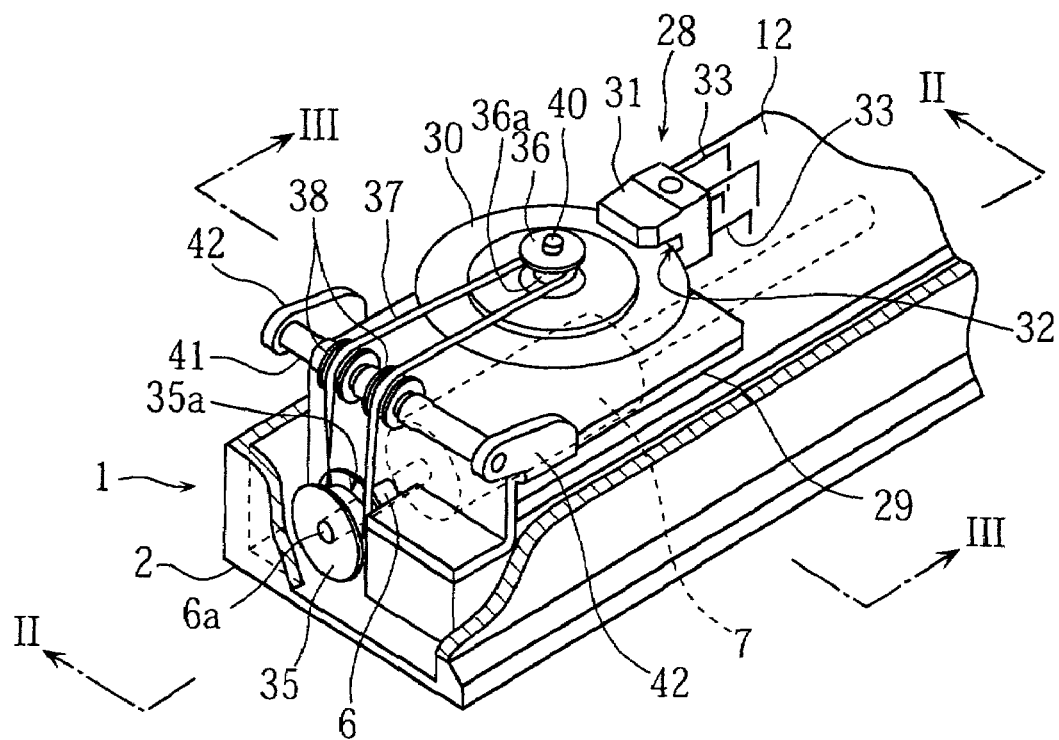
FIG. 1 is a perspective view showing an image scanner embodying the present invention.
Figure 2:
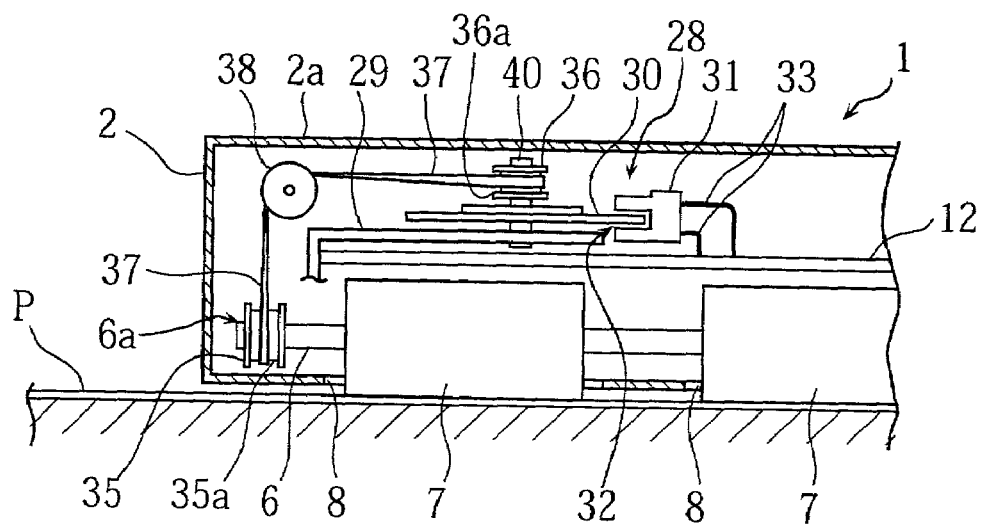
FIG. 2 is a sectional view taken along lines II—II in FIG. 1.
Figure 3:
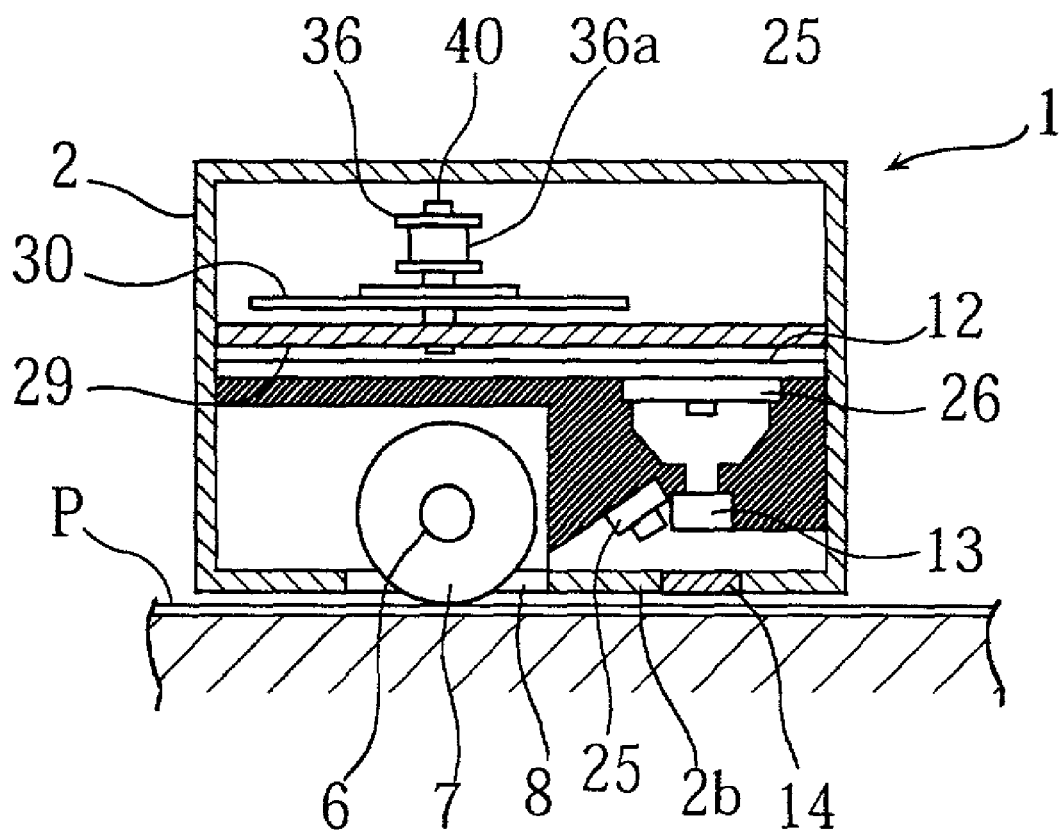
FIG. 3 is a sectional view taken along lines III—III in FIG. 1.

As shown in FIGS. 1 through 3, the body 2 accommodates an elongate substrate 12 on which a line sensor 26 is mounted for reading the document image. The line sensor 26 comprises a plurality of light receiving elements (e.g. photoelectric conversion elements) arranged in a row which extends longitudinally of the body 2. The row of light receiving elements has a length corresponding to the image reading width (which is at least equal to but normally greater than the width of the original document P). The body 2 also accommodates a light source 25 (e.g. an LED array) for illuminating the document P. A transparent glass or plastic plate 14 is provided at the bottom surface 2b of the body 2. Between the transparent plate 14 and the line sensor 26 is provided a lens array 13 for collecting light reflected from the document P to form an actual-size erect image at the line sensor 26.

The body 2 further accommodates another substrate (not shown) on which an IC chip (not shown) is mounted as a controller for processing the image data from the line sensor 26. The controller is connected to the line sensor 26 and a photointerrupter 31 (see FIGS. 1 and 2) which will be described later. Alternatively, such a controller may be provided in a personal computer connected to the scanner 1.

The body 2 additionally accommodates a shaft 6 extending longitudinally of the body 2 and rotatably held in the body 2. The shaft 6 carries a plurality of rollers 7 for rotation therewith. The rollers 7 may be formed of a rubber having an appropriate rigidity. Each of the rollers 7 partially projects outward of the body 2 through an opening 8 formed at the bottom surface 2b of the body 2 for contact with the document P. In use, the plurality of rollers 7 rotate together in contact with the document P so that the body 2 is prevented from moving in an improper direction due to slip for example.

The shaft 6 is connected via a drive transmission to a rotary encoder 28 which functions as a rotation detecting means, as more specifically described later. The drive transmission comprises a first pulley 35 coaxially with the rollers 7, a second pulley 36 mounted coaxially with a rotary disc 30, a belt 37 wound around the first and the second pulleys 35, 36, and a pair of intermediate pulleys 38.

The first pulley 35 having a circumferential engaging surface 35a is attached to one end 6a of the shaft 6. The second pulley 36 having a circumferential engaging surface 36a is attached to the end of a shaft 40 which carries the rotary disc 30 of the rotary encoder 28 and extends perpendicularly to the roller-carrying shaft 6 thereabove. The circumferential engaging surface 36a of the second pulley 36 is diametrically smaller than the circumferential engaging surface 35a of the first pulley 35. Both intermediate pulleys 38 are attached to a shaft 41 extending widthwise of the body 2 for rotation about the shaft 41. The intermediate pulleys 38 are located above the first pulley 35 and beside the second pulley 36 longitudinally of the body 2. The shaft 41 is attached to a pair of clamping pieces 42 extending from a support member 29 provided in the body 2.

With the above-described structure, the belt 37 is advanced by the first, the second, and the intermediate pulleys 35, 36 and 38 while changing its advancing direction by the intermediate pulleys 38. Thus, the belt 37 can circumvent with an obstructive part, if any, between the first pulley 35 and the second pulley 36. As a result, the rotation of the rollers 7 is reliably transmitted to the rotary disc 30.

Figure 9:
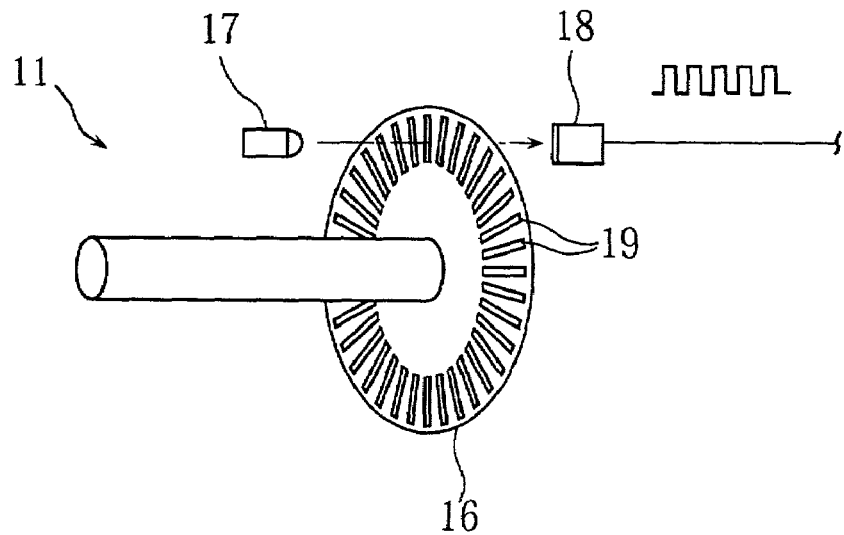
FIG. 9 is a view schematically showing the structure of a rotary encoder.
Figure 10:
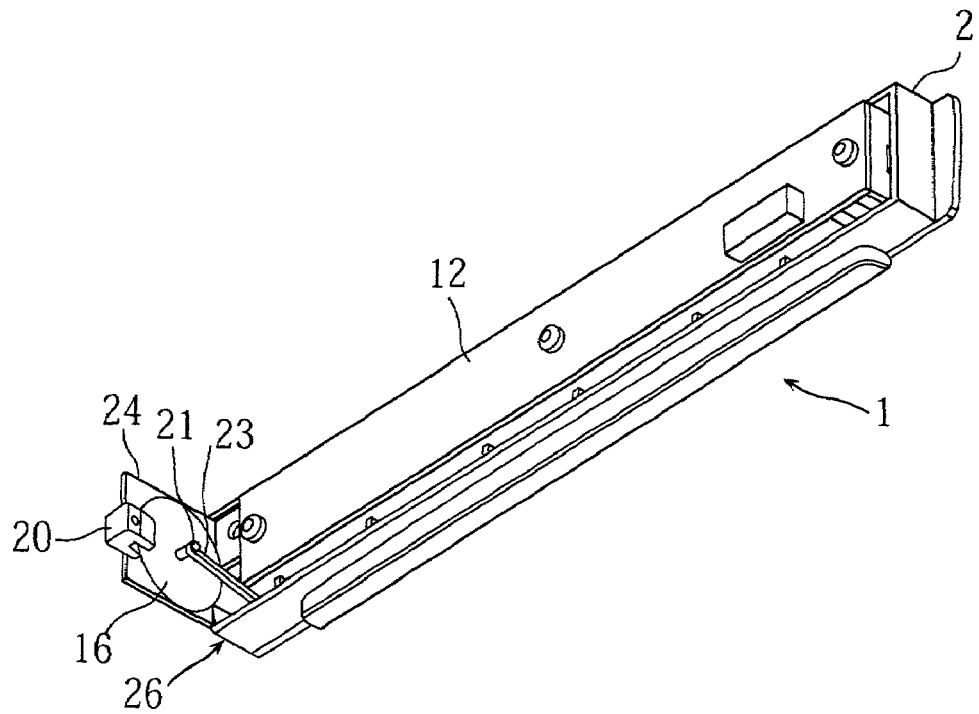
FIG. 10 is a perspective view showing another example of prior-art image scanner.
Figure 11:
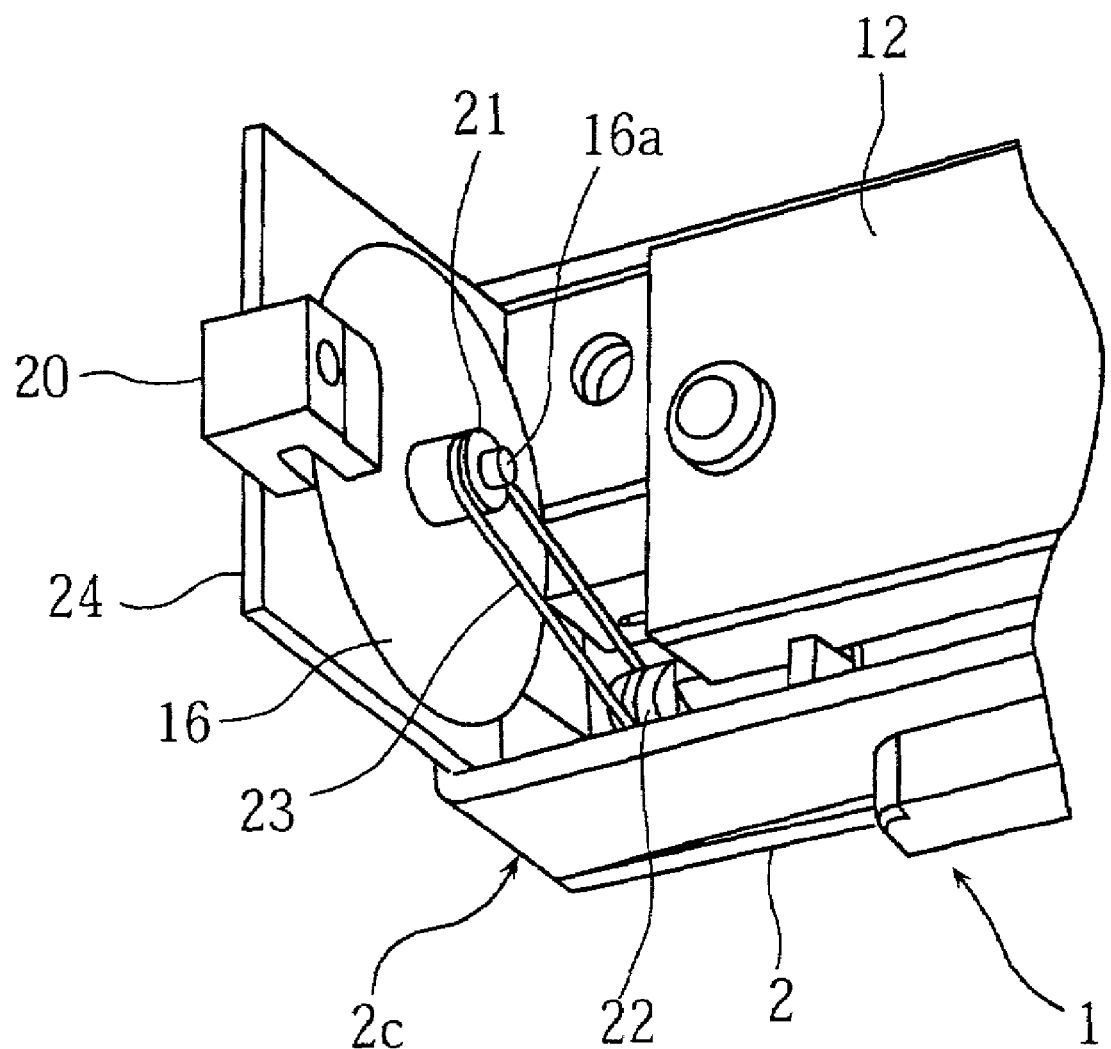
FIG. 11 is an enlarged view showing a portion of the image scanner of FIG. 10.

As shown in FIGS. 1 and 2, the rotary disc 30 of the rotary encoder 28 is rotatably mounted on the shaft 40a which extends perpendicularly upward from a support member 29. The rotary disc 30 has a plurality of radially extending slits (not show) at a small interval circumferentially of the disc 30, like the slits 19 shown in FIG. 9 for the prior art image scanner.

The photointerrupter 31 of the rotary encoder 28 has a groove 32 for partially receiving the rotary disc 30. The photointerrupter 31 incorporates a light emitting element (not shown) arranged above or below the rotary disc 30, and a light receiving element (not shown) arranged below or above the disc 30. The photointerrupter 31 is mounted on the substrate 12 by soldering connection terminals 33 onto the substrate 12 for example.

As previously described, the shaft 40 for the rotary disc 30 extends perpendicularly to the shaft 6 of the rollers 7. As a result, the rotary disc 30 is disposed above the upper surface 2a of the body 2 in parallel thereto. Therefore, unlike the prior art scanner, the rotary disc 30 can be housed in the body 2 without increasing the height or thickness of the body 2, which leads to a size reduction of the scanner 1.

With the above-described arrangement, it is possible to increase the diameter of the rotary disc 30 as much as the width of the body 2 permits, without increasing the size of the body 2. Accordingly, the number of the slits (see the slits 19 in FIG. 9) formed in the rotary disc 30 can be correspondingly increased. Therefore, it is possible to enhance the detecting resolution of the rotary encoder 28, which results in a corresponding enhancement of the resolution in reading the document image.

Moreover, by disposing the rotary disc 30 in parallel to the substrate 12, it is possible to solder the connection terminals 33 of the photointerrupter 31 directly on the substrate 12. In the prior art scanner shown in FIG. 9, by contrast, since the rotary disc 16 projects perpendicularly to the substrate 2, the photointerrupter 20 need be connected to the substrate 12 via a multi-conductor cable and a connector. According to the illustrated embodiment of the present invention, the photointerrupter 31 can be connected or mounted on the substrate 12 without using such a cable and connector. Therefore, the cost for manufacturing the scanner 1 can be reduced correspondingly.

Next, the operation of the scanner 1 having the above-described structure is described. When the user moves the body 2 over a document P for scanning the document image, the rollers 7 rotate in contact with the document P, thereby causing the first pulley 35 to rotate. The rotational force of the first pulley 35 is transmitted via the belt 37 and the intermediate pulleys 38 to the second pulley 36 for rotating the rotary disc 30. At this time, the intermediate pulleys 38 change the advancing direction of the belt 37 while providing the belt 37 with an appropriate tension. As the rotary disc 30 rotates, the photointerrupter 31 detects light passing through the slits formed in the rotary disc 30 and outputs detection signals to the controller.

Based on the detection signals transmitted from the photointerrupter 31, the controller detects the rotational angle and/or the number of revolutions of the rotary disc 30, which reflects the number of revolutions of the rollers 7. As a result, the controller figures out the scanning distance of the body 2.

On the other hand, as the body 2 moves along the document P, the line sensor 26 reads the document image line by line, each line corresponding to one dot of resolution in the secondary scanning direction. When the controller determines, based on the detection signals from the photointerrupter 31, that the body 2 has moved a distance for one line (0.085 mm for example), the controller outputs a timing signal to the line sensor 26. Upon receiving the timing signal, the line sensor 26 outputs image signals for the line to the controller and starts image reading for the next line. The above-described operation is repeated for each of the subsequent lines.

The controller successively outputs the image data for each line received from the line sensor 26 to a non-illustrated personal computer for example. Thus, the image data is stored as bitmap data in a memory of the personal computer. As a result of repeating the above-described operation, the entire image data for the two-dimensional document image is stored in the personal computer.

It is to be noted that there may be some cases in which a desired resolution cannot be obtained depending on the relation between the number of the slits of the rotary disc 30 and the outer diameter of the rollers 7a. Such a problem can be avoided by adjusting the rotation speed of the rotary disc 3. With the above-described handy scanner 1, it is possible to adjust the rotation speed of the rotary disc 30 by appropriately setting the ratio between the respective diameters of the circumferential engaging surfaces 35a, 35b of the first and the second pulleys 35, 36.

Specifically, assuming that the rotary disc 30 has an outer diameter of 16 mm and is provided with 180 slits each having a width of 0.1 mm. Therefore, the photointerrupter 31 detects light 180 times to output 180 pulses to the controller while the rotary disc 30 makes one full rotation.

On the other hand, if the outer diameter of each roller 7 is 5.8 mm and the resolution is 300 dpi in the secondary scanning direction, the number of dots scanned during one rotation of the roller 7 is 215, which is found by 5.8 mm×π×300 dots/inch÷25.4 mm/inch. Therefore, if such a roller rotates at the same speed as the rotary disc 30 having only the 180 slits, the controller detects 180 pulses but not 215 pulses corresponding to 215 dots, consequently failing to obtain the desired resolution of 300 dpi.

In such a case, the rotation speed of the disc 30 need be adjusted. As previously described, the first pulley 35 is mounted on the same shaft 6 as the rollers 7, whereas the second pulley 36 is mounted on the same shaft 40 as the rotary disc 30. Thus, the rotation speed of the disc 30 can be easily adjusted by properly setting the respective diameters of the circumferential engaging surfaces 35a, 35b of the first and the second pulleys 35, 36. Specifically, since 215:180=1.2:1, the ratio of the diameter of the circumferential engaging surface 35a of the first pulley 35 to the diameter of the circumferential engaging surface 36a of the second pulley 36 need be set to 1.2:1. For example, the diameter of the circumferential engaging surface 35a of the first pulley 35 may be set to 3.6 mm, whereas the diameter of the circumferential engaging surface 36a of the second pulley 36 may be set to 3.0 mm. With such diameter setting, while the rollers 7 makes one revolution, the rotary disc 30 makes 1.2 revolutions for causing the photointerrupter 31 to detect light 215 times which correspond to 215 dots. As a result, the desired resolution of 300 dpi can be obtained.

In the prior art scanner which uses gears for transmitting the rotation of the rollers to the rotary disc, the rotation speed of the disc need be adjusted by changing the gear ratio between two gears or by arranging three or more gears for example, which causes an increase of the parts cost. However, in the image scanner of the present embodiment, it is possible to easily adjust the rotation speed of the rotary disc 30 by appropriately setting the ratio between the respective diameters of the circumferential engaging surfaces 35a, 35b of the first and the second pulleys 35, 36. Therefore, it is possible to obtain a desired image reading resolution without increasing the parts cost.

Figure 4:
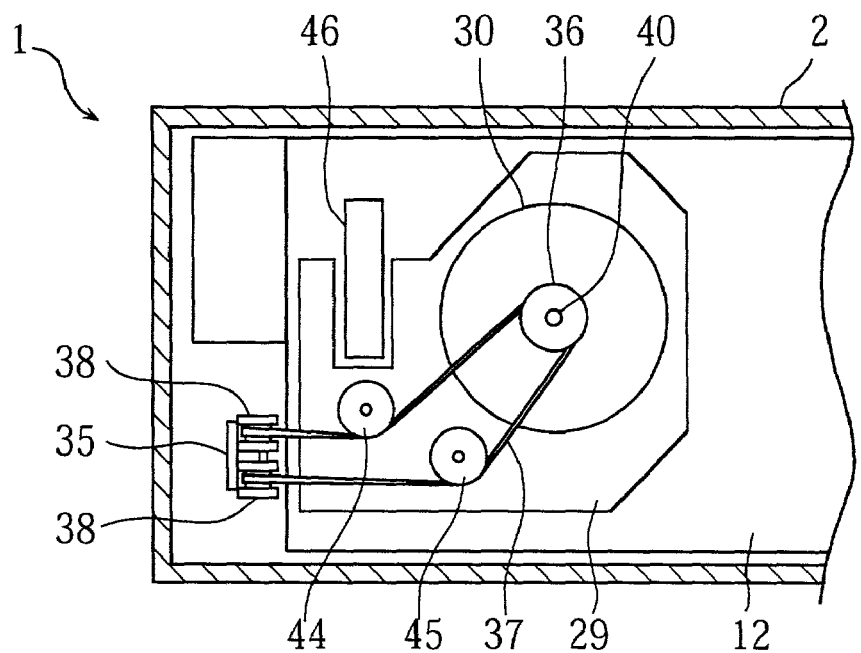
FIG. 4 is a see-through plan view showing a modified image scanner embodying the present invention.
Figure 5:
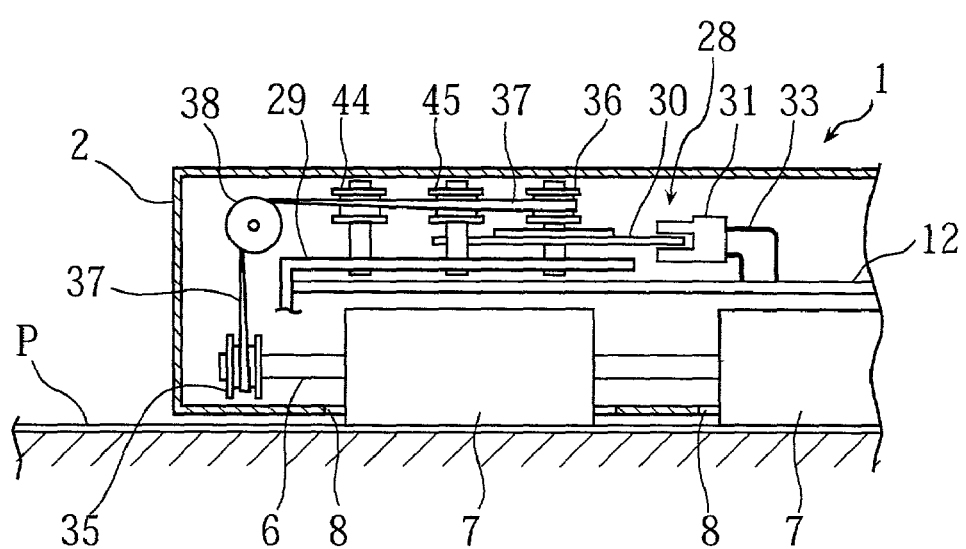
FIG. 5 is a sectional view showing the image scanner of FIG. 4.

FIGS. 4 and 5 illustrate a modified image scanner embodying the present invention. The modified image scanner incorporates its inside parts at a higher density than the image scanner shown in FIGS. 1 through 3. Therefore, one or some of the inside parts may interfere with the belt 37 if it is arranged in the same manner as in the embodiment of FIGS. 1 through 3. In the modified embodiment of FIGS. 4 and 5, additional intermediate pulleys 44, 45 are provided for positionally shifting the track of the belt 37 to circumvent an obstructive part 46.

Specifically, as shown in FIG. 4, the rollers 7, the shaft 6, the first pulley 35 and the pair of intermediate pulleys 38 are arranged at positions which are offset widthwise toward one longitudinal side of the body 2 for avoiding the otherwise interferring part 46. The scanner 1 further includes the additional intermediate pulleys 44, 45 provided on the support member 29 between the intermediate pulleys 38 and the second pulley 36 for causing the belt 37 to extend obliquely toward the second pulley 36. The structure of the modified scanner 1 is otherwise identical to that of the scanner of the foregoing embodiment.

The additional pulleys 44, 45 maybe disposed at any other positions, provided that the belt 37 guided thereby circumvents the obstructive part 46 (or any other obstructive part). Further, the number of additional intermediate pulleys is optional.

The preferred embodiments of the present invention being thus described, it is obvious that the same may be varied in many ways. For instance, the rotary encoder 28 may be disposed at any position as long as it does not increase the size of the body 2. Further, use may be made of reflection type photointerrupter. Moreover, the rotary encoder 28 may be designed to magnetically or otherwise detect the rotation of the rotary disc 30. Such variations should not be regarded as a departure from the spirit and scope of the present invention, and all such modifications as would be obvious to those skilled in the art are intended to be covered by the appended claims.

The invention claimed is:

1. An image scanner comprising:
an elongate body having an image reading surface for facing an original document;
a substrate provided in the body in parallel to the image reading surface;
a line sensor extending in the body longitudinally thereof and mounted on the substrate in facing the relationship to the image reading surface for reading the document as the body moves along the document;
a roller shaft rotatably supported in the body to extend longitudinally of the body;
at least one roller supported on the roller shaft for rotating therewith while rolling on the document;
a rotary encoder for detecting the rotation of said at least one roller for determining a scanning distance of the body, the rotary encoder including a rotary disk supported 15 on a disc shaft; and
a drive transmission for connecting said at least one roller to the rotary encoder;
wherein the rotary disc is oriented parallel to the substrate and the image reading surface; and
wherein the drive transmission comprises a first pulley mounted on the roller shaft, a second pulley mounted on the disc shaft, a belt wound around the first pulley and the second pulley. and a pair of intermediate pulleys for bending the belt.

2. The image scanner according to claim 1, wherein the disc shaft extends perpendicularly to the roller shaft.

3. The image scanner according to claim 1, wherein the rotary encoder also including an optical detector mounted directly on the substrate adjacent to the 5 rotary disc.

4. The image scanner according to claim 1, wherein each of the first pulley and the second pulley has a circumferential engaging surface, the circumferential engaging surface of the first pulley differs diametrically from that of the second pulley.

5. The image scanner according to claim 1, wherein the drive transmission further comprises at least one additional pair of intermediate pulleys.

6. The image scanner according to claim 5, wherein said at least one additional pair of intermediate pulleys have a respective rotational axis extending parallel to the disc shaft.

7. The image scanner according to claim 5, wherein the roller shaft, the first pulley and the intermediate pulleys are located offset toward a longitudinal side of the body.

* * * * *